June 14, 1938. J. G. JORDAN 2,120,786
TREATMENT OF SEWAGE
Filed Aug. 2, 1935 3 Sheets-Sheet 1

Inventor:
John G. Jordan
By Freeman, Sweet, Albrecht & Weidman
Attorneys

Inventor:
John G. Jordan

June 14, 1938.  J. G. JORDAN  2,120,786
TREATMENT OF SEWAGE
Filed Aug. 2, 1935  3 Sheets-Sheet 3
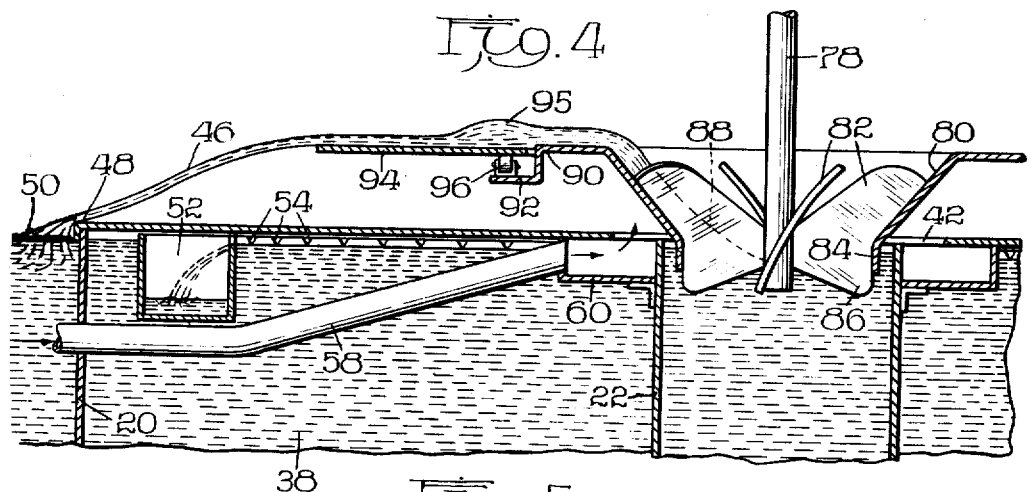
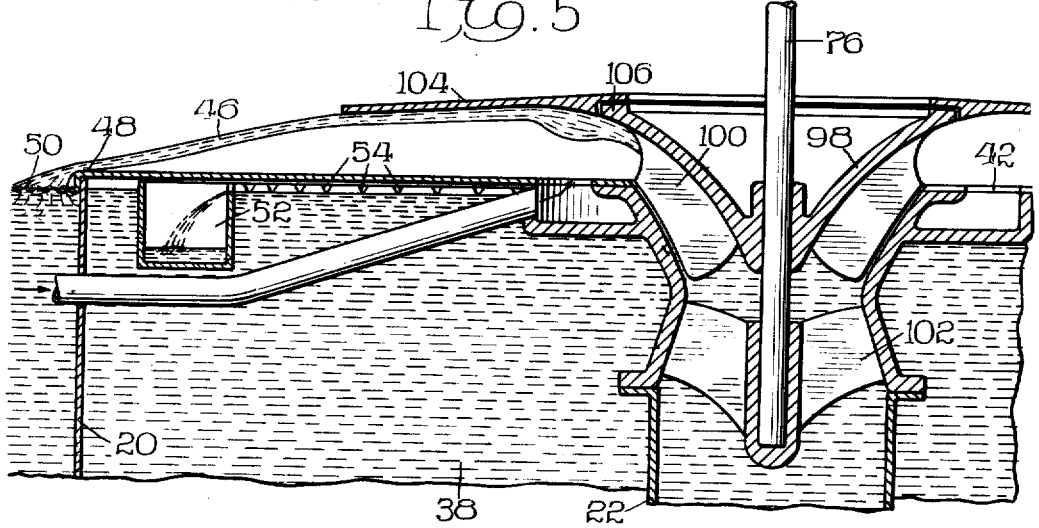
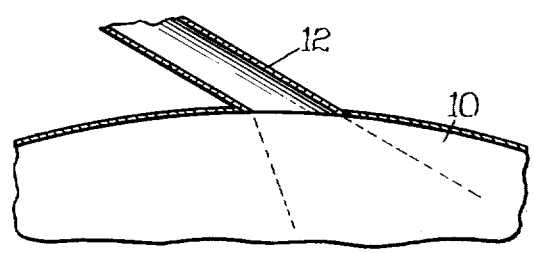
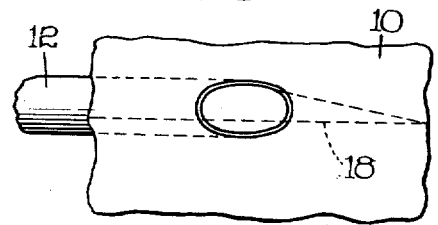
Inventor:
John G. Jordan
By Freeman, Sweet, Albrecht & Weidman
Attorneys Patented June 14, 1938

2,120,786

UNITED STATES PATENT OFFICE 2,120,786

TREATMENT OF SEWAGE

John G. Jordan, Chicago, Ill.

Application August 2, 1935, Serial No. 34,312

16 Claims. (Cl. 210—8)

My invention relates to the treatment of sewage and includes among its objects and advantages an increase in effectiveness in aeration and oxidation, and a reduction in power consumption for aeration and oxidation; together with a more effective and automatically selective separation of floc in a combined aerating and separating unit.

In the accompanying drawings:

Figure 4 is an enlarged sectional view of the aerating unit and adjacent parts;

Figure 5 is a section similar to Figure 4 of an impulse aerating unit;

Figure 6 is a diagrammatic horizontal section of a raw sewage inlet;

Figure 7 is an elevation of the same inlet;

Figure 8 is a fragmentary view of a modification;

Figure 9 is a diagrammatic showing of a simple aeration; and

Figure 1:
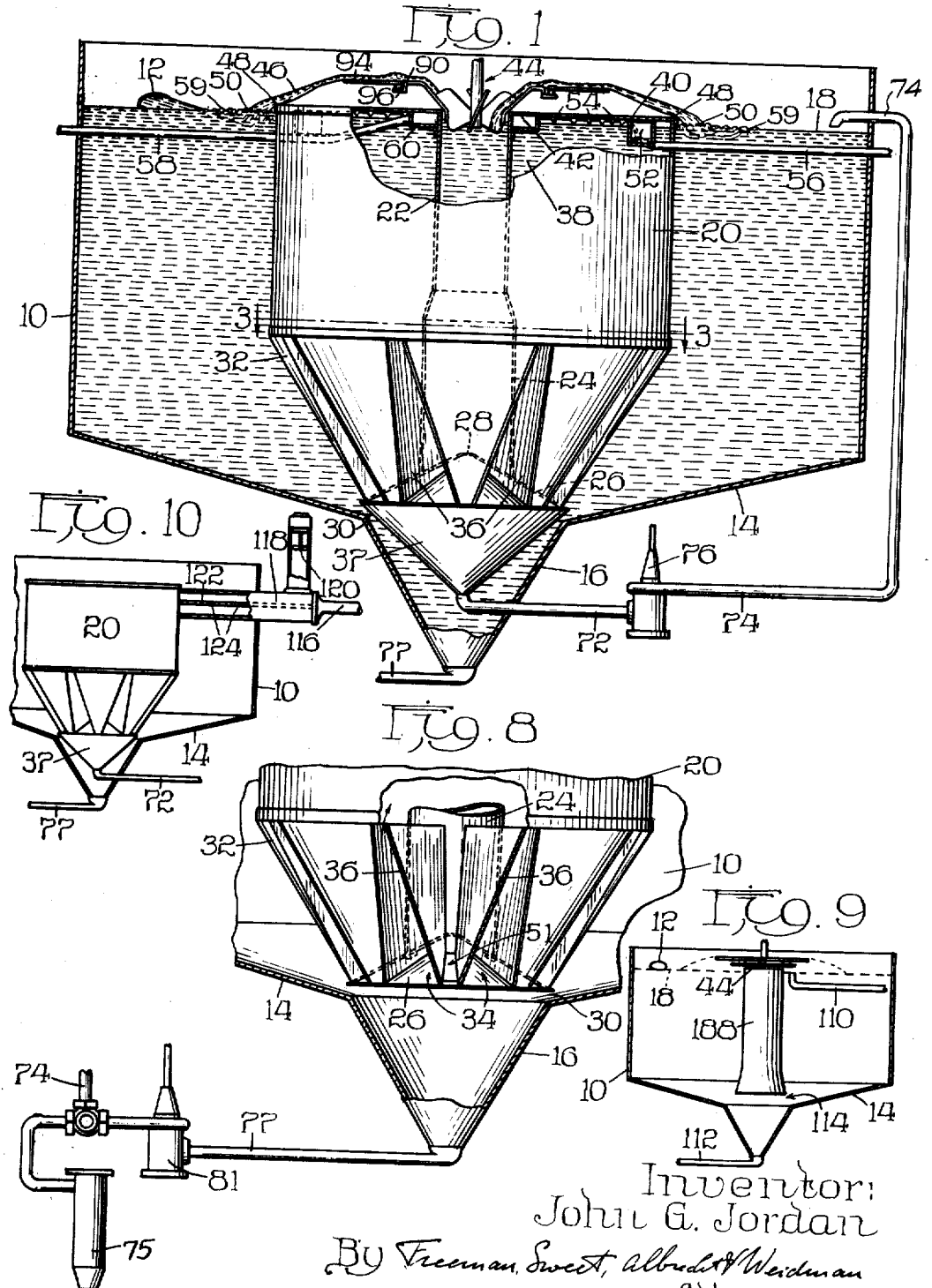
Figure 1 is a central vertical section through a complete treating tank with the central unit chiefly in elevation but partly broken away in section.
Figure 2:
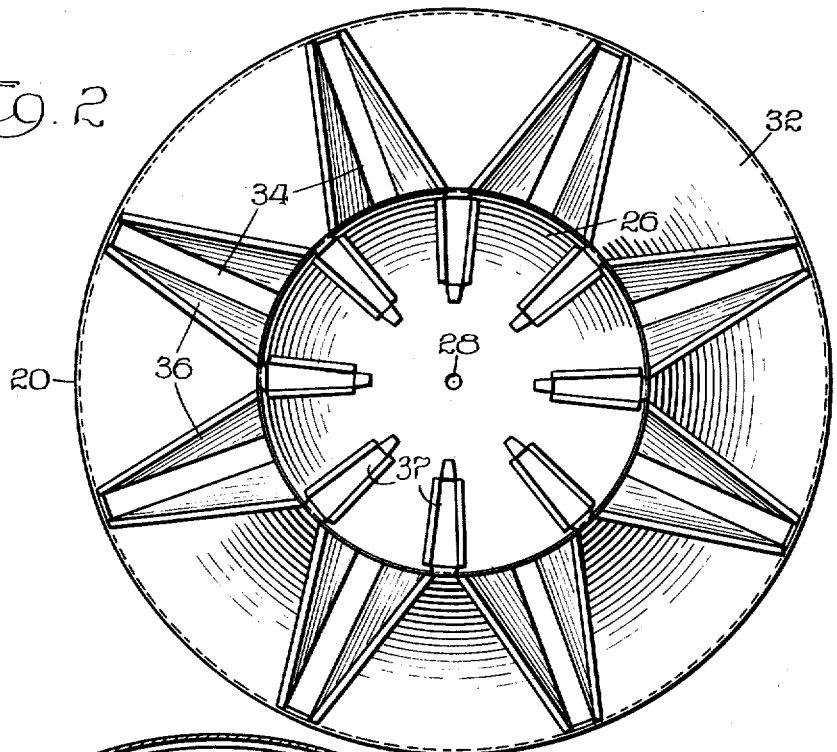
Figure 2 is a bottom plan view of the central unit.
Figure 3:
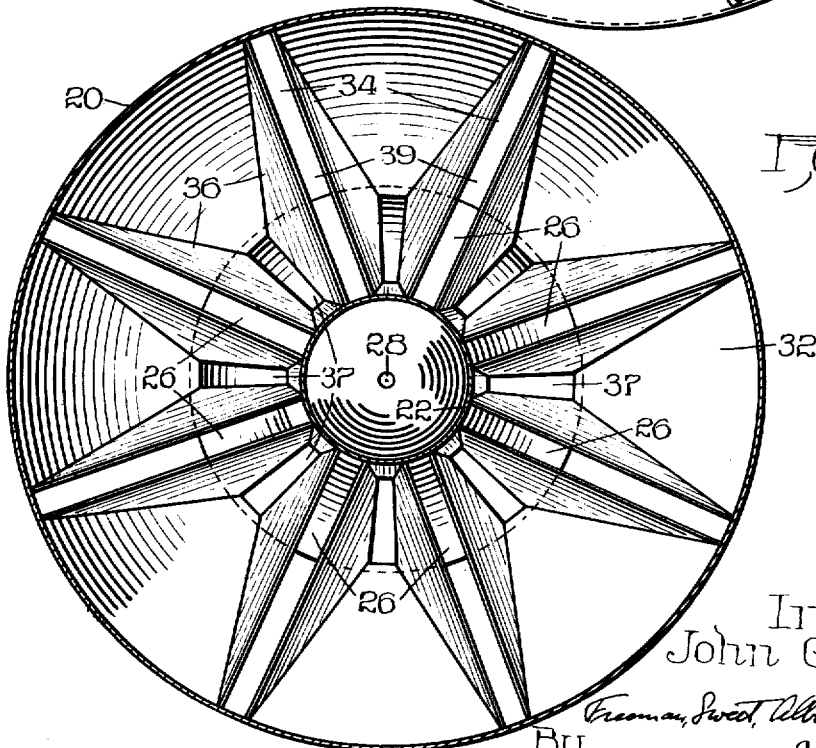
Figure 3 is a section on line 3—3 of Figure 1.

Figure 10 indicates a simplified arrangement of ducts.

In the embodiment of the invention selected for illustration, the large main tank 10 receives raw sewage through an inlet 12, arranged tangential to said main tank. The liquid level in the tank is such as to submerge a minor fraction of the inlet, so that the stream enters and spreads out in the main body of liquid to produce a slow rotation thereof in the tank, substantially as indicated by the dotted lines in Figures 6 and 7. The tank 10 has a tapered bottom 14 merging into a receiving cone 16 for accumulating treated floc or sludge. The liquid level is indicated at 18, and the central unit 20 defines an annular outer space in which the main body of liquid under treatment is contained. Thus the kinetic energy of the incoming raw sewage keeps the entire contents of the tank 10 in slow rotation.

Main circulation

Centrally located in the unit 20 is the draft tube 22, which tapers outwardly a little at the bottom as indicated at 24, and is substantially closed at its bottom by the inverted cone 26. The upper end of the draft tube 22 terminates at, or above, the level of the liquid outside the tube. A very small hole 28 at the top of the inverted cone 26 prevents the accumulation of any gas under the cone. The lower edge of the cone 26 is slightly spaced from the upper edge of the cone 16 to define an annular port 30. The outer cylinder 20 of the central unit is joined to the lower edge of the cone 26 by an outer cone 32. Eight inlet apertures are formed in the cone 32. These inlet apertures are tapered, being relatively narrow at the top and broad enough at the bottom so that the spaces between them are comparable to the top width of the openings themselves. The lower portion of the draft tube 22 is similarly apertured and radial intake passages 34 leading inward from the intake openings into the draft tube are defined by inclined partitions 36 extending from the cone 32 in to the edges of the corresponding openings into the draft tube. The bottoms of these intake passages are closed by the cone 26, but the tops stand open at 39 to permit a portion of the liquid being treated to move upward, out of the liquid flowing radially inward, into the quiescent space at 38 between the draft tube 22 and the cylinder 20.

Except for a small central opening, the top of the cylinder 20 is closed over, as by the cover indicated at 40, which terminates short of the upper edge of the draft tube to define an annular air inlet opening at 42. In the upper end of the draft tube I position a liquid lifting and spreading device indicated generally by the reference character 44 and illustrated in detail in Figures 4 and 5. The device lifts liquid from the top of the draft tube and spreads it outwardly in a thin umbrella shaped curtain at 46, and the curtain is floated on a body of air entering at the air inlet 42. As illustrated, the curtain impinges somewhat at 48 on the outer edge of the cover 40, but practically all of the curtain clears the cover 40 and impinges directly on the main body of liquid as indicated at 50. As the curtain is moving spirally with a material component of tangential movement, as well as radial, movement, this impact sets up a slow rotary movement of the entire outer annular mass of liquid, which movement is further maintained by the discharge of new sewage at 12. The rotation of the main mass in the outer annular space of the tank should be sufficient to produce an effective scouring action on the bottom 14, but not enough to cause centrifugal force to interfere appreciably with the progress of the heavy fully treated floc and raw solids, as they work their way down the inclined bottom and into the cone 16.

Thus the primary circulation within the tank is in a torus with the contents of the large outer annular mass moving slowly and gently downward, an inward movement through the radial passages at the bottom of the unit and a more rapid upward movement through the draft tube and then out in the umbrella 46. As will become more clearly apparent hereinafter, the speed of circulation in the torus is independent of the withdrawal of settled floc, either for recirculation or digestion or the like, and of the influx of raw sewage.

Air is supplied through an inlet pipe 58 to the annular header 60 defining the inlet 42, to move outwardly under the curtain 46. I have found that the power necessary to effectively treat a predetermined amount of sewage is materially reduced by the use of air under the umbrella 46.

In experiments without any such air inlet, I have found that the unsupported portion of the umbrella is drawn quickly downward by a vacuum inside the umbrella. This effect is materially reduced by merely providing the pipe 58 so that air can flow into the space under the umbrella. By forcing air into the pipe 58 with a relatively small amount of pressure the umbrella is further inflated to the extent indicated in Figures 4 and 5. The amount of pressure employed should be very small, being less than that required to rupture the umbrella and destroy its continuity.

With such a pressure, the umbrella 46 curves downward very gently after leaving the edge of the spreading device, but changes its curvature in the opposite direction just before its slight glancing air cushioned impact either with the cover 40 or the surface of the liquid. The liquid in the umbrella churns up a foam in the main liquid mass. The film of liquid seems to float along over the cover 40, separated from actual contact with it by a film of air. The air under the umbrella is carried by the umbrella itself into the turbulent zone of contact with the main liquid mass, and there thoroughly mingled with the liquid. When the operation is properly maintained a mass of bubbles 59 float over the surface of the main mass of liquid, beyond the zone of turbulence at the edge of the umbrella.

*Liquid separation*

From the upper edges of the radial intake passages, fluid is continually abstracted to move upward into the quiescent mass at 38. The velocity of this movement is dependent on the rate of withdrawal of treated liquid through trough 52, and is kept below the floatation speed of the floc, and each horizontal inlet 26 into the bottom of the space 38 lies between two quiescent pockets of materially greater extent. The entry of the liquid into the space 38 sets up two small cylindrical vortices, one on each side of each entrance passage 26, from the lower portions of which vortices the floc separates radially and moves downward in the tapering pockets between the partitions 36. These separation pockets are open at their bottoms, through registering slots 51 in the cone 26, so that the floc accumulating in them can move down through the cone 26 and accumulate in the cone 37. The inclination of the partitions 36 should be steep enough to eliminate any tendency of the descending floc to lodge on them. I find an angle of 15° or 20° to the vertical to be entirely satisfactory in this respect. Liquid in the space 38 is clarified by the separation of floc at its lower level, and rises slowly to overflow into the annular outlet trough 52 through a series of weir notches 54, and thence out through a discharge pipe 56. The floc passing downward through the slits 51 in the cone 26 is retained in the inner cone 37 and returned to the main tank for recirculation as by the pipes 72 and 74 and the pump 76.

*Floc separation*

A smaller amount of treated floc will work down through the annular opening at 30 into the lower cone 16 and this floc will be withdrawn to the digester through a pipe 77.

As the floc in the lower inwardly moving part of the torus moves across the bottom 14, it will be obvious that any floc particles that settle faster than others, either by reason of increased size or increased density, or because of any ionization or small electrostatic forces that may be generated, will work along nearest the bottom 14, and by their presence there compel lighter and/or smaller particles to move at a higher level. Without attempting to explain the action further, I have found the fact to be that ripe or treated floc, in which the bacteriological processes are apparently complete, will settle down under green or unripe floc in which the bacterio-logical processes of treatment are still going on. Accordingly, the separation at the orifice 30 is not a mere subdivision into parts, but a selective action tending to sort out ripe or inactive floc and deposit it in the cone 16, while the green or active floc, moving at a level only slightly higher, enters the radial passages for a trip up the draft tube 22 or into the bottom of the space 38 and down into the cone 37; and in either instance back again for further aeration and treatment. Any quickly settling raw solids, such as nuts and tooth brushes, will also pass into the cone 16 on the first trip, and never go up the draft tube 22 at all.

In Figure 8 I have indicated a modification in which cone 37 is simply omitted. Where the load conditions or the nature of the sewage handled are such as to render separate removal of ripe and unripe floc unnecessary or undesirable, all the floc may be collected in the cone 16 and returned to the tank, or diverted at intervals to a digester 75, by means of a pump 81 and three way valve 79, or other arrangement as desired.

*The aerator*

Referring now to Figure 4, the vertical shaft 78 supports a turning or centrifugal aerator device comprising the saucer 80 and the supporting spokes 82. The saucer 80 has a central vertical lip 84 extending down slightly below the water level, and the spokes 82 are in the shape of propeller blades, which also have heels at 86 extending down a little further into the liquid to get hold of it. The liquid level when the device is in operation is substantially as indicated at 88 with the central pocket naturally resulting from the rotation, and the mass of liquid moving outwardly as well as rotating around the shaft 78 and decreasing in thickness as its linear horizontal dimension increases due to the outward movement.

The complete impeller of Figure 4, includes the saucer 80 and the carrier plate 94. The saucer 80 ends at 90 and carries an annular shelf 92. The carrier plate 94 rides on rollers 96 so that it turns freely on the shelf 92. The liquid leaving the edge of the saucer at 90 passes out over the carrier plate 94 and leaves the outer edge of the plate 94 substantially without increase in kinetic energy during its passage over the plate. In fact, the total kinetic energy of the liquid leaving the plate 94 will differ from the energy of the liquid flowing onto the plate 94 by the relatively negligible losses of friction against the air above the water and below the plate and between the water and the plate, and the relatively negligible gain due to the friction in the rollers 96. By controlling the amount of friction in the rollers 96 the kinetic energy of the water leaving the plate 94 can be controlled with great accuracy. It will be obvious that the crack between the carrier plate 94 and the adjacent saucer edge 90 cannot be air tight, and that either the pressure of the air under the umbrella, or the suction of the water flowing over the crack, will entrain a film of air between the upper surface of the plate 94 and the thin sheet of water moving outwardly over it. It will also be obvious that in an installation where the outer edge of the plate 94 has twice the diameter of the outer edge of the saucer at 90, the energy of the water leaving the plate 94, if the plate 94 were driven at the same rotary speed as the saucer, would be substantially four times the energy of the water leaving the edge 90. Thus the plate 94 gets the water from the edge 90 out to its own outer edge where it leaves with substantially the same linear velocity as it had when leaving the edge 90, in a sheet only half as thick as at the edge 90 because the horizontal dimension of the sheet has been doubled, but still with the same tangential velocity as well as the radial velocity. The plate 94 will turn at a materially slower speed in revolutions per minute than the saucer 80, and in this way the power necessary to get the water out into the curtain 46 is reduced to substantially one-fourth of what it would otherwise be. Immediately after leaving the edge 90, the liquid piles up into an annular bead, as indicated at 95, because the inner edge of the plate 94 moves at a materially slower speed than the edge 90.

Referring now to Figure 5, I have illustrated an aerator in which the rotor 98 is an inverted cone with special propeller blades at 100. The liquid moves up out of the draft tube 22 with the guidance of radial vanes 102 to prevent building up a whirling movement in the draft tube, and is then thrown upward and outward by the blades 100 to move along the lower surface of the floating annular plate 104. Under ordinary conditions of operation, it is unnecessary to provide the annular bearing at 106 with rollers, as the upward force of the water striking the plate 104 combined with the lifting effect of the small air pressure under the plate, will pick the plate up and let it float out of contact with the rotor 98. Under such conditions, the plate 104 will rotate at a slower speed than the rotor 98 precisely as the plate 94, and will perform the same function of guiding the water radially out into the curtain 46 without using up power in increasing the kinetic energy of the water. I have found that the umbrella of water indicated in Figure 5 will move out and stay in contact with the plate 104, without separating from it and with substantially no dripping at all from the exposed lower surface. I believe this results from the capillary action of the wet plate and the absence of any point where air could have access to get between the plate and the water. This seems to have an effect equivalent to a vacuum holding the water up against the plate at any point where the dynamic conditions of movement of the liquid are such that it might otherwise leave the plate. Both plates 104 and 94 have polished surfaces of non-corroding material on the faces that contact the fluid.

In Figure 9 the draft tube 108 is associated with an aerator 44 and an air inlet tube 110, but the separating unit 20 has been omitted and the aerated product is all withdrawn at 112 into an independent separator. In such a unit, the aeration is as in Figure 1 and a separation of ripe and unripe floc is effected at the annular passageway 114.

In Figure 10 the outlet 116 for separated liquid runs adjacent the air intake 118 fed by the fan 120. The diaphragm 122 separating the two passages is provided with weep holes, as at 124, so that any water that may find its way into the air intake 118 during shut down periods, or for any other reason, can flow out freely.

Sewage treatment plants treating sewage by the activated sludge process have usually used either one or a combination of two methods, for accomplishing such treatment. The first method commonly known as the "diffused air" type, discharges compressed air below the surface of the sewage, thus producing aeration and oxidation and at the same time, by suitable placement of the air discharge, a vortical rotation of the sewage is maintained. The second method known as the "mechanical aeration" type lifts the sewage above the surface, exposing it to the air, thus accomplishing aeration and oxidation and by the use of a draft tube below the lifting mechanism a vortical rotation of the sewage is maintained. The combined type introduces compressed air below the surface of the sewage in a draft tube used as an air lift and discharges the sewage at the upper end, into the air above the surface of the sewage, thus producing aeration and oxidation and a vortical rotation of the sewage. A modified form of the combined type reverses the flow in the draft tube, drawing the sewage and entrained air downward and discharging the air below the surface of the sewage.

By the use of my invention the process of aeration and oxidation is accomplished with the expenditure of a minimum amount of energy for lifting the sewage and supplying it with an abundance of air with the necessary oxygen.

A small unit according to my invention developed activated sludge of the typical reddish brown color in forty two (42) to forty eight (48) hours and the capacity of the unit was greatly in excess of the estimated capacity based on available data of known performance of such equipment. I believe this marked improvement to be intimately connected with the greater effectiveness of aeration and oxidation obtained by the thin umbrella shaped sheet of liquid and the abundant low pressure air under the umbrella.

Without further elaboration the foregoing will so fully explain my invention that others may, by applying knowledge current at the time of application, readily adapt the same for use under various conditions of service. It will, for instance, be obvious that the plate 104 might carry a film of liquid on both sides instead of only on one.

I claim:

1. Sewage treating equipment comprising, in combination: a receiver having a bottom; a draft tube coaxial with said receiver, means for lifting liquid from the top of said tube, aerating it and returning it to the top of said receiver, whereby a slow flow is set up radially inward from the bottom of said receiver to the bottom of said tube; and wall means cooperating with the central portion of said receiver bottom to define a relatively stagnant setting chamber having an annular inlet, said inlet lying at the bottom of the path of the liquid flowing inwardly toward the bottom of said tube.

2. Sewage treating equipment comprising, in combination: a large torus-shaped receiver; a draft tube coaxial with the torus; means for lifting liquid from the top of said tube, aerating it and returning it to the top of said torus, whereby a slow flow is set up radially inward from the bottom of said receiver to the bottom of said tube; a conical settling chamber having an annular inlet lying at the bottom of the path of the liquid flowing inwardly to said tube; a small torus-shaped receiver encircling the draft tube; said small torus-shaped receiver having spaced inlet openings lying at the top of the path of liquid flowing inwardly to said tube, steep-sided pockets between said inlet openings and outlet openings at the bottoms of said pockets; a conical floc receiver partly housed in said settling chamber; means for withdrawing floc from said small receiver; and means for withdrawing liquid from the top of said small torus-shaped receiver at such a speed as to maintain the upward flow in said small torus-shaped receiver below the flotation speed of the floc therein.

3. Sewage treating equipment comprising, in combination: a large receiver having a conical portion of relatively slight inclination downward and inward; a small receiver substantially coaxial with said large receiver; a central draft tube smaller than said small receiver and substantially coaxial therewith; baffles in the lower portion of said small receiver, defining a plurality of "in" passages leading from said large receiver to said draft tube; the upper edges of said "in" passages being open in narrow slots to permit upward flow into said small receiver; impeller means at the upper end of said draft tube for withdrawing liquid rising through said tube, aerating said withdrawn liquid and throwing it back into said large receiver; said baffles defining between each two adjacent "in" passages a tapered "down" passage of maximum dimension at the top; the bottom of said small receiver having slots registering with the lower ends of said "down" passages; the slotted portion of said small receiver bottom being conical with its apex uppermost; said slightly inclined large receiver bottom ending adjacent to but spaced slightly below the periphery of the slotted portion of said small receiver bottom; said large receiver bottom having a steeply inclined central conical portion with its apex lowermost, defining with said slotted portion of said small receiver bottom, a settling chamber having a pointed top and bottom, and an annular inlet at substantially its maximum diameter; and means for withdrawing material from the bottom of said settling chamber.

4. Sewage treating equipment comprising, in combination: a large receiver having a conical bottom with its apex lowermost; a small receiver substantially coaxial with said large receiver; a central draft tube smaller than said small receiver and substantilly coaxial therewith; baffles in the lower portion of said small receiver, defining an "in" passage leading from said large receiver to said draft tube; an upper portion of said "in" passage being open to permit upward flow into said small receiver; means at the upper end of said draft tube for withdrawing liquid rising through said tube and throwing it back into said large receiver; said baffles defining a "down" passage; the bottom of said small receiver having a slot registering with the lower end of said "down" passage; said large receiver bottom including an outer annular portion ending adjacent to but spaced slightly below the periphery of said small receiver bottom, and a central conical portion with its apex lowermost underlying said small receiver bottom; and means for withdrawing material from the apex of said central conical portion of said large receiver bottom.

5. The combination of claim 4 combined with: a second conical receiver with its apex lowermost, positioned above the central conical portion of said large receiver bottom; said second conical receiver forming with said small receiver bottom a separate chamber receiving the flow through said down passage; and separate means for withdrawing material from the apex of said second conical receiver.

6. The method of treating sewage which comprises: retaining a main annular mass of liquid; withdrawing liquid in a horizontally flowing stream from near the bottom of the annular mass; separating an upper and a lower portion mass; delivering from said horizontally flowing stream; delivering said lower portion into a digester; separating the floc from said upper portion; discharging said upper portion; and returning the floc separated from said upper portion to the main mass of liquid.

7. The method of treating sewage which comprises: retaining a main annular mass of liquid; withdrawing liquid in an inwardly flowing stream from near the bottom of the annular mass; returning the inwardly flowing stream to the top of the annular mass; withdrawing liquid from said inwardly flowing stream into the bottom of a relatively quiescent mass; separating the liquid thus withdrawn into an upwardly flowing stream and a downwardly flowing stream; maintaining the velocity of flow in said upwardly moving stream below the flotation speed of the floc in said stream; and returning the downwardly flowing stream to the top of the main annular mass.

8. The method of treating sewage which comprises: retaining a main annular mass of liquid; withdrawing liquid in an inwardly flowing stream from near the bottom of the annular mass; turning the inwardly flowing stream into a central rising stream; returning the central rising stream to the annular mass; segregating a smaller relatively quiescent annular mass between said main annular mass and said rising stream; withdrawing liquid from the upper portion of said inwardly flowing stream into said relatively quiescent mass; separating the liquid thus withdrawn into an upwardly flowing portion occupying the entire cross section of said relatively quiescent mass, and a downwardly flowing portion; and maintaining the upward velocity of flow in said relatively quiescent mass below the flotation speed of the floc in said mass.

9. The method of treating sewage which comprises: retaining a main annular mass of liquid; withdrawing liquid in a plurality of radial inwardly flowing streams from near the bottom of the annular mass; uniting the inwardly flowing streams into a central rising stream; spreading the central rising stream into an umbrella above the level of the annular mass to aerate the same; throwing the umbrella with tangential as well as radial velocity to cause said annular mass to rotate about its axis; feeding raw sewage in at the outer periphery of said annular mass, and contributing to the rotation of the annular mass by the impulse of the feed; segregating a smaller relatively quiescent annular mass between said main annular mass and said rising stream; withdrawing liquid from the upper edges of said inwardly flowing streams into said relatively quiescent mass; separating the liquid thus withdrawn into an upwardly flowing stream occupying the entire cross section of said relatively quiescent mass, and downwardly flowing streams passing down between said inwardly flowing streams but segregated therefrom; maintaining the upward velocity of flow in said relatively quiescent mass below the flotation speed of the floc in said mass; and uniting said downwardly flowing streams in a single slowly moving stream charged with separated floc.

10. The method of treating sewage which comprises: retaining a main annular mass of liquid; withdrawing liquid in a plurality of radial inwardly flowing streams from near the bottom of the annular mass; uniting the inwardly flowing streams into a central rising stream; spreading the central rising stream into an umbrella above the level of the annular mass to aerate the same; throwing the umbrella with tangential as well as radial velocity to cause said annular mass to rotate about its axis; feeding raw sewage in at the outer periphery of said annular mass, and contributing to the rotation of the annular mass by the impulse of the feed; segregating a smaller relatively quiescent annular mass between said main annular mass and said rising stream; withdrawing liquid from the upper edges of said inwardly flowing streams into said relatively quiescent mass; separating the liquid thus withdrawn into an upwardly flowing stream occupying the entire cross section of said relatively quiescent mass, and downwardly flowing streams passing down between said inwardly flowing streams but segregated therefrom; maintaining the upward velocity of flow in said relatively quiescent mass below the flotation speed of the floc in said mass; uniting said downwardly flowing streams in a single slowly moving stream charged with separated floc; returning all of said charged stream to said main annular mass; and withdrawing from said main mass in an annular stream passing near the lower edges of the outer ends of said inwardly flowing streams, liquid charged with floc.

11. The method of aerating liquid which comprises: lifting a portion of liquid from a larger mass, spreading it in the form of a thin, imperforate, umbrella-shaped sheet having radial and rotary movement, extending the area of said umbrella-shaped sheet by the action of its own kinetic energy, and introducing air into the space under said umbrella-shaped sheet to further extend the periphery thereof by flotation, whereby oxygen is supplied to aerate said umbrella-shaped sheet and said larger mass by mingling with said larger mass at the peripheral juncture of said umbrella-shaped sheet with said larger mass.

12. The method of aerating liquid which comprises: lifting a portion of liquid from a larger mass, spreading it in the form of a thin, imperforate, umbrella-shaped sheet having radial and rotary movement, extending the area of said umbrella-shaped sheet under the action of its own kinetic energy by supporting it only against downward movement and only out to a predetermined radius, whereby the expanding sheet moves radially outward without receiving power from its support and passes beyond the outer edge of its support to fall back to the larger mass in a still imperforate condition.

13. An aerator comprising: a liquid receiver; propeller blades rotating about a vertical axis and dipping into the liquid in said receiver to pick up said liquid; a conical saucer adjacent and above said blades positioned to engage the lifted liquid with its lower surface and spread it radially into a thin imperforate umbrella-shaped sheet; means for introducing air under said imperforate umbrella-shaped sheet; said saucer including an outer lip adjacent the outer periphery of the body of said saucer and freely rotatable with respect thereto.

14. Sewage treating equipment comprising, in combination: a torus-shaped receiver; a draft tube coaxial with the torus; means for lifting liquid from the top of said tube, aerating it and returning it to the top of said torus, whereby a slow flow is set up radially inward from the bottom of said receiver to the bottom of said tube; means for separating from the stream flowing radially inward to said tube a lower portion and an upper portion; and separate means for separating floc from each portion of said stream.

15. Sewage treating equipment comprising, in combination: a torus-shaped receiver, aerating means tending to set up a vortex in said receiver with the lower part of the torus moving radially inward and the upper part moving radially outward; means for separately withdrawing from said inwardly moving lower portion, top and bottom fractions together comprising only part of said inwardly moving portion, leaving the remainder of said inwardly moving portion to recirculate through the vortex; separation means for separating the floc from said top fraction; means for returning to the vortex the floc separated from the top fraction; and means for permanently withdrawing said bottom fraction.

16. Sewage treatment equipment comprising: peripheral walls adapted to segregate and confine a fluid mass; walls defining a plurality of separate bottom openings communicating with the bottom of said mass; outlet means at the bottom for withdrawing fluid through alternate ones of said openings; inlet means at the bottom for delivering through said remaining openings fluid in excess of that withdrawn by said outlet means, whereby said segregated mass of fluid rises slowly; and top outlet means affording an exit for excess fluid.

JOHN G. JORDAN.